United States Patent [19]

Olund

[11] 4,046,533

[45] Sept. 6, 1977

[54] REFRIGERATION WORKING FLUID CONTAINING BRANCHED CHAIN ALKYLBENZENE LUBRICANT

[75] Inventor: Sven A. Olund, San Rafael, Calif.

[73] Assignee: Chevron Research Company, San Francisco, Calif.

[21] Appl. No.: 652,581

[22] Filed: Jan. 26, 1976

Related U.S. Application Data

[63] Continuation of Ser. No. 423,835, Dec. 11, 1973, abandoned, which is a continuation-in-part of Ser. No. 317,318, Dec. 21, 1972, abandoned, which is a continuation-in-part of Ser. No. 213,174, Dec. 28, 1971, Pat. No. 3,733,850, which is a continuation-in-part of Ser. No. 3,523, Jan. 16, 1970, Pat. No. 3,642,634.

[51] Int. Cl.$^2$ .......................... F25B 9/00; C09K 5/04
[52] U.S. Cl. ....................................... 62/468; 62/114; 252/59; 252/67; 252/68; 260/671 B
[58] Field of Search ............... 260/671 B; 252/68, 59, 252/67; 62/114, 112, 468

[56] References Cited

U.S. PATENT DOCUMENTS

| 2,851,503 | 9/1958 | Shiffler ........................... 260/671 B |
| 3,092,981 | 6/1963 | Begeman et al. ..................... 252/68 |
| 3,169,928 | 2/1965 | Herold ............................... 252/68 |
| 3,449,459 | 6/1969 | Asfazadourian ..................... 252/68 |
| 3,478,113 | 10/1969 | Bray ................................. 252/73 |
| 3,642,634 | 2/1972 | Olund ............................... 252/68 |

*Primary Examiner*—Mayer Weinblatt
*Assistant Examiner*—John D. Smith
*Attorney, Agent, or Firm*—D. A. Newell; John Stoner, Jr.

[57] ABSTRACT

Refrigeration apparatus containing working fluid consisting essentially of refrigerant and lubricant, said refrigerant being halo-substituted hydrocarbon of 1 to 3 carbon atoms and at least 40% by weight fluorine and said lubricant being mixed branched chain alkylbenzenes having an average molecular weight in the range of from about 300 to about 470, said alkylbenzenes being produced by HF alkylation of benzenes with mixed polypropylenes.

4 Claims, No Drawings

REFRIGERATION WORKING FLUID CONTAINING BRANCHED CHAIN ALKYLBENZENE LUBRICANT

CROSS-REFERENCE TO RELATED APPLICATIONS

This application is a continuation of U.S. application Ser. No. 423,835, filed Dec. 11, 1973, which is a continuation-in-part of U.S. application Ser. No. 317,318, filed Dec. 21, 1972, which is a continuation-in-part of Olund U.S. application Ser. No. 213,174, filed Dec. 28, 1971, and issued as U.S. Pat. No. 3,733,850 on May 22, 1973, which, in turn, is a continuation-in-part of Olund U.S. application Ser. No. 3,523, filed Jan. 16, 1970 and issued as U.S. Pat. No. 3,642,634 on Feb. 15, 1972. Both of aforesaid applications Ser. No. 423,835 and Ser. No. 317,318 are now abandoned.

BACKGROUND OF THE INVENTION

1. Field of the Invention

This invention relates to a refrigeration working fluid composed of a halogenated hydrocarbon refrigerant having a high fluorine concentration and a branched chain alkylbenzene lubricant, said fluid being in a refrigeration apparatus of the sealed compressor type. In particular, the invention is concerned with such lubricants for use with such refrigerants in which the fluorine content is at least 40% by weight.

2. Prior Art

It has been known that difluoromonochloromethane, difluorodichloromethane, and methyl chloride are useful as refrigerating agents in refrigerating machines. It has also been known that difluoromonochloromethane and other high fluorine content halogenated hydrocarbons have certain essential advantages in comparison with the use of difluorodichloromethane which has been primarily used up to now. For example, difluoromonochloromethane has 1.6–1.7 times the volumetric refrigerating capacity as does difluorodichloromethane. Furthermore, in refrigerating machines operated with difluoromonochloromethane, lower cooling temperatures can be obtained in one-step operation than with difluorodichloromethane under otherwise equal conditions.

However, it is a disadvantage that in contrast to difluorodichloromethane the high fluorine content halogenated hydrocarbons are not completely miscible with the mineral oils conventionally used as lubricating agents at low temperatures. The consequence of this is that expensive oil separators and oil return devices must be built in refrigerating machines operated with these highly fluorinated hydrocarbons.

In order to overcome the above-mentioned disadvantages occurring in the use of fluorinated hydrocarbons, instead of mineral oils, secondary silicic acid butyl esters (silicones) have been used as lubricating agents. It has been found that such esters are well miscible with difluoromonochloromethane so that the use of oil separators and oil return devices could be dispensed with. However, the use of said esters has the disadvantage that they are relatively expensive and their lubricating effect is lower than that of mineral oils.

Another solution to the above-described miscibility problem is by the use of polyalkylated benzene as a lubricant; see U.S. Pat. Nos. 3,169,928 and 3,092,981. These polyalkylated benzenes are characterized as having at least two alkyl groups, a boiling point between 150° and 330° C at 12 mm and a viscosity between 9° E and 37° E at 20° C and between 2° E and 5° E at 50° C. The alkyl groups used are of both straight and branched chain structure. Those exemplified had from 10 to 13 carbons each.

THE INVENTION

In accordance with the present invention an improved refrigeration apparatus is provided in which said apparatus contains a working fluid consisting essentially of a refrigerant and a chemically inert, wax-free lubricant, said refrigerant being a halo-substituted hydrocarbon having from 1 to 3 carbon atoms and at least about 40% by weight of fluorine and said lubricant being a mixture of mono-substituted branched chain alkylbenzenes having an average molecular weight in the range of about 300 to about 470, the alkyl groups of said alkylbenzenes being at least about 60% by weight polypropylene and having an average of at least one branch for every 5 carbon atoms.

The branched chain monoalkylbenzenes have from 16 to 28 carbon atoms in the alkyl group and are excellent lubricants for use in admixture with the highly fluorinated halogenated hydrocarbon refrigerants in sealed compressor-type refrigeration apparatus. The resulting mixture is a homogeneous refrigeration working fluid, compatible even at the low temperature existing in the evaporator of a refrigeration apparatus.

EMBODIMENT

The alkyl group of the alkylbenzene in the compositions of the invention must be branched, having at least one branch per every five, preferably four, carbon atoms. The most preferred alkyl group is one having one branch per every three carbon atoms and is prepared by polymerization of propylene. In the alkyl chain, branching is determined by dividing the number of carbon atoms connected to three other carbon atoms plus two times the number of carbon atoms connected to four other carbon atoms by the total number of carbon atoms in the alkyl groups.

Alkylbenzenes for this use are prepared by alkylating benzene with an alkylating agent in the presence of a catalyst. Typical alkylating agents are the branched chain olefins or branched chain halides, preferably chlorides. The preferred method of preparation is by the HF catalyzed reaction of benzene with a branched chain olefin.

Satisfactory alkylbenzenes have an average molecular weight in the range of 300 to 470 and can be prepared from the following branched chain olefins: hexapropylene; pentaisobutylene; a mixed $C_{16-28}$ polypropylene-polyisobutylene blend; oligomers of propylene and the 4 to 9 carbon atom 1-olefins in a mole ratio greater than 75/25, respectively; 4,6-dimethyl-8-isobutyl-3-dodecene; 2,4-dimethyl-5-isobutyl-5-dodecene; 4,6,8,12-tetramethyl-10-ethyl-9-tridecene; 2,4,6,8,10-pentamethyl-2-tridecene; 2,4,6,8,10,12-hexamethyl-2-pentadecene; 4,6,8,10-tetramethyl-2-hexadecene; 4,6,8,10,12,14-hexamethyl-2-nonadecene; 2,4,6,8,10,12-hexamethyl-12-eicosens; 2,4,6,6,8,10,10,12-octamethyl-2-tridecene, etc. The preferred olefin is a blend of polypropylene having from 18 to 24 carbon atoms. The preferred alkylbenzenes have a molecular weight in the range of 325 to 415.

The alkylbenzene mixtures of this invention have viscosities in the range of 80 to 800 SUS (measured at 100° F), preferably in the range of 150 to 500. Three viscosity grades of lubricants are conventionally supplied for use in refrigeration apparatus: 150 SUS, 300 SUS and 500 SUS. The mixtures of alkylbenzenes herein described may be tailored to any one of these three grades, but the 150 SUS grade is preferred and is obtained from branched chain alkylbenzenes produced by HF alkylation of benzene with mixed polypropylenes having an average molecular weight in the range of 330 to 350. The alkylbenzenes are primarily monosubstituted alkylbenzene but may contain minor proportions of polyalkylaryl hydrocarbons within the aforesaid molecular weight ranges. The alkylbenzenes preferably are dried to contain not more than 30 parts per million of water. Such drying may be accomplished by conventional means such as blowing with an inert gas, including air, nitrogen, helium, etc., and may be accomplished in connection with other treatment— for example, clay treatment, preferably acid-treated clay, used to remove various impurities.

The highly fluorinated halogenated hydrocarbon refrigerants useful in these working fluids are those having in excess of 40%, by weight, of fluorine. Examples of satisfactory compounds are difluorochloromethane, pentafluorochloroethane, trifluorochloromethane, sym-tetrafluorodichloroethane, pentafluorobromoethane, and mixtures thereof. The preferred compound is difluorochloromethane, or mixtures of difluorochloromethane with other highly fluorinated compounds. These materials are readily available commercially and are commonly referred to as the Freon refrigerants.

In the refrigeration apparatus as a whole, there will be from 10 to 100 parts of refrigerant per part of lubricant. However, in the evaporator, the relative amounts of refrigerant and lubricant undergo a large change as the refrigerant is vaporized. Consequently, it is here that incompatibility becomes a problem. It has been found that maximum incompatibility occurs at about 10% to 20% by weight of lubricant. (See U.S. Pat. No. 3,092,931, FIG. 3; U.S. Pat. No. 3,169,928, FIG. 1) As a result, potential lubricants are usually tested for compatibility at concentrations in this range at ever lower temperatures. Two measurements can be made: (1) the temperature at which separation first occurs and (2) the quantity present in the oil-rich phase at successively lower temperatures. Both values are important; a high temperature, voluminous separation would be wholly inoperative, whereas a relatively high temperature separation of a minute amount of oil which did not change upon going to even lower temperatures may be operative. In general, the separation of more than 5 vol. % oil phase is considered unacceptable.

EXPERIMENTAL

The following examples further illustrate the improved refrigeration apparatus and working fluid therefor according to the present invention. Unless otherwise indicated, the proportions are on a weight basis.

Experiments were carried out to determine which monoalkylbenzene compounds formed stable solutions with fluorinated refrigerants at low temperatures. An 8 ml. glass ampule was flushed with nitrogen and then charged with 5 ml. of the test solution. The ampule was sealed and then immersed in a constant temperature bath. After 30 minutes, the ampule was examined visually for any separated phases. The volume percent of the separated phase was measured. The results of these tests are given in Table I.

TABLE I

COMPATABILITY OF ALKYLBENZENE COMPOUNDS AND HIGHLY FLUORINATED REFRIGERANTS

| Example No. | Identification | Viscosity at 100° F, SUS | Concentration, Wt % | Separated Phase, Vol % at, ° F | | | |
|---|---|---|---|---|---|---|---|
| | | | | 0 | −40 | −80 | −115 |
| A. With Difluorochloromethane Refrigerant | | | | | | | |
| 1 | Hexapropylene Benzene | 121 | 11.4 | 0 | 0.1 | 0.1 | 0.1 |
| 2 | Blend of $C_9$-$C_{30}$ Polypropylene Benzene (MW 320) | 112 | 11.4 | 0 | 0 | 0 | 0 |
| 3 | Blend of $C_9$-$C_{30}$ Polypropylene Benzene (MW 340) | 149 | 10.0 | 0 | 0.1 | 0.1 | 0.1 |
| 4 | Blend of $C_{15}$-$C_{20}$ Linear Alkylbenzene (MW 340) | 133 | 11.6 | 0 | 12 | — | 25 |
| B. With a 48/51.2 Blend of Difluorochloromethane and Pentafluorochloroethane | | | | | | | |
| 5 | Hexapropylene Benzene | 121 | 11.0 | 0.1 | 0.1 | 7 | 12 |
| 6 | Blend of $C_9$-$C_{30}$ Polypropylene Benzene (MW 330) | 127 | 10.5 | 0 | 0 | 5 | 12 |
| 7 | Blend of $C_9$-$C_{30}$ Polypropylene Benzene (MW 340) | 146 | 10.6 | 0 | 0 | 7 | 15 |
| 8 | Blend of $C_{15}$-$C_{20}$ Linear Alkylbenzene (MW 340) | 133 | 10.7 | 14 | 15 | 20 | 25 |

The results in the above table clearly show that the highly fluorinated hydrocarbons and branched chain alkylbenzenes form solutions having greater mutual solubility at low temperatures than they do with linear alkylbenzene compounds of essentially the same viscosity. Compare Examples 1, 2, 3 vs. 4; and Examples 5, 6, 7 vs. 8.

In other experiments the branched chain alkylbenzene blend of Example 3 and the linear alkylbenzene blend of Example 4 were tested at −80° and −115° F at several different concentrations with highly fluorinated refrigerants. The results are given in Table II.

TABLE II

EFFECT OF CONCENTRATION ON MISCIBILITY OF ALKYLBENZENE AND A HIGHLY FLUORINATED REFRIGERANT

| Example No. | Concentration of Alkylbenzene, Wt% | Separated Phase, Vol % | | | | | |
|---|---|---|---|---|---|---|---|
| | | Branched Chain Alkylbenzene at | | | Linear Alkylbenzene at | | |
| | | −40° F | −80° F | −115° F | −40° F | −80° F | −115° F |
| A. With Difluorochloromethane Refrigerant | | | | | | | |
| 9 | 2.0 | — | — | — | 0.1 | 0.1 | 16[1] |

TABLE II-continued
EFFECT OF CONCENTRATION ON MISCIBILITY OF ALKYLBENZENE AND A HIGHLY FLUORINATED REFRIGERANT

| Example No. | Concentration of Alkylbenzene, Wt% | Separated Phase, Vol % | | | | | |
|---|---|---|---|---|---|---|---|
| | | Branched Chain Alkylbenzene at | | | Linear Alkylbenzene at | | |
| | | −40° F | −80° F | −115° F | −40° F | −80° F | −115° F |
| 10 | 5.4 and 4.7[2] | 0 | 0.1 | 0.1 | 0.1 | 5 | 33[1] |
| 11 | 10.0 and 11.6[2] | 0 | 0.1 | 0.1 | 12 | — | 25[1] |
| 12 | 22.2 and 21.6[2] | 0 | 0 | 30 | 33 | 45 | 47[1] |
| B. With a 48.8/52.2 Blend of Difluorochloromethane and Pentafluoroethane | | | | | | | |
| 13 | 2.4 and 2.1[2] | 0 | 0 | 0 | 0.1 | 4 | 6[1] |
| 14 | 5.7 and 5.1[2] | 0.1 | 0.1 | 5[3] | 7 | 10 | 12[1] |
| 15 | 10.6 and 10.7[2] | 0.1 | 6 | 14[3] | 15 | 20 | 25[1] |
| 16 | 22.8 | 0.1 | 42 | 45[3] | — | — | — |

[1]Unmovable, solid precipitate.
[2]First number refers to concentration of branched chain alkylbenzenes and second number refers to concentration of linear alkylbenzenes.
[3]Viscous, but movable layer.

The data of Table II show that the volume of the separated phase increases with increasing concentration. The data also show the vast superiority of the branched chain alkylbenzenes over the linear alkylbenzenes. Even when the former separate out as a separate phase, the phase is movable; whereas the linear alkylbenzenes not only form a larger separate phase, but at −115° F, this separated layer is an unmovable solid phase which causes plugging problems in the refrigeration apparatus. Consequently, the linear alkylbenzenes are not suitable lubricants for use in refrigeration apparatus at temperatures below −40° F.

The refrigerator lubricant of the invention may contain additives of the types conventionally used. These include foam inhibitors, such as silicone polymers; metal deactivators, such as alizarine, quinizarine, Schiff bases, alkyl sulfides, zinc dithiocarbamates, and mercaptobenzothiazole; oxidation inhibitors, such as dibutyl-p-cresol; viscosity improvers, such as polybutenes; and scavengers for hydrogen chloride, such as epoxides.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. In a refrigeration apparatus containing a working fluid consisting essentially of a refrigerant and a chemically inert, wax-free lubricant, said refrigerant being a halo-substituted hydrocarbon having from 1 to 3 carbon atoms and at least about 40% by weight of fluorine and said lubricant being an alkylbenzene, the improvement which comprises using as a lubricant a mixture of mono-substituted, branched chain alkylbenzenes having an average molecular weight in the range of about 300 to about 470, the alkyl groups of said alkylbenzenes being at least about 60% by weight polypropylene and having an average of at least 1 branch for every 4 carbons in the alkyl group, there being from 10 to 100 parts by weight of refrigerant per part by weight of lubricant and said polypropylene alkylbenzene mixture being produced by HF alkylation of benzene with mixed polypropylenes.

2. Improved refrigeration apparatus in accordance with claim 1 in which the refrigerant has 1 or 2 carbon atoms.

3. A refrigeration working fluid consisting essentially of a refrigerant and a chemically inert, wax-free lubricant, said refrigerant being a halo-substituted hydrocarbon having from 1 to 3 carbon atoms and at least about 40% by weight of fluorine and said lubricant being a mixture of mono-substituted branched chain alkylbenzenes having an average molecular weight in the range of about 300 to about 470, the alkyl groups of said alkylbenzenes being at least about 60% by weight polypropylene and having an average of at least one branch for every 4 carbon atoms in the alkyl groups, there being from 10 to 100 parts by weight of refrigerant per part by weight of lubricant and said polypropylene alkylbenzene mixture being produced by HF alkylation of benzene with mixed polypropylenes.

4. Refrigeration working fluid in accordance with claim 3 in which the refrigerant has 1 or 2 carbon atoms.

* * * * *